April 23, 1940. E. O. Z. TOLLEY ET AL 2,198,187
VENETIAN BLIND CORD LOCK
Filed Sept. 2, 1938

E.O.Z. Tolley
Irvin J. Hoffman
INVENTORS.

BY
ATTORNEY.

Patented Apr. 23, 1940

2,198,187

UNITED STATES PATENT OFFICE 2,198,187

VENETIAN BLIND CORD LOCK

Edward O. Z. Tolley, Los Angeles, and Irvin James Hoffman, Alhambra, Calif., assignors to National Venetian Blind Co., Los Angeles, Calif., a corporation of California Application September 2, 1938, Serial No. 228,132

2 Claims. (Cl. 156—17)

Our invention relates to Venetian blinds, and more particularly to anchoring devices of the type commonly used for automatically locking the cords used for raising and lowering the slats of Venetian blinds.

The use of an anchoring device of the character described in connection with the elevating cords of a Venetian blind obviates the necessity of tying the depending portion of the cords to a button fastened to the window frame, or otherwise making the depending portions fast in order to retain the slats of the blind in selected position, inasmuch as such anchoring devices are equipped with a pivoted dog adapted to engage the cords and press them tightly against a suitable pressure member, such as a sheave, rigid portion of the housing, or, in some cases, an opposed similarly mounted dog. These parts are so disposed with relation to each other and to the cord, that movement of the dog or dogs with the cords in that direction of the cord's movement which accompanies lowering of the blind, causes them to swing more tightly into engagement with the cords, clamping them securely and thus preventing any further lowering of the blind. The dog is urged to move in this direction by the cords with which it is frictionally engaged, hence it is the weight of those slats of the blind which are supported by the cords which supplies the force whereby the dog moves into locking position and pressed against the cords to insure their being tightly gripped. In order to release the cords it is necessary merely to pull them in the opposite direction far enough to swing the dog out of engagement with the cords, whereupon the dog will swing, by gravity or otherwise, away from the cords far enough to establish clearance between itself and the cords, thus permitting adjustment of the blind to any desired position of elevation by the appropriate movement of the cords. When the desired adjustment has been attained the operator has but to swing the cords toward the dog, thereby establishing frictional engagement between the cords and the dog, and then to diminish the force with which he is pulling upon the cords. This will permit the cords to be pulled by the weight of the blind, moving them in that direction which will cause the dog to swing into locking position. The extent of such movement will be for only a fraction of an inch inasmuch as the dog will almost immediately bind the cords between itself and the pressure member, securely anchoring the cords and thus retaining the blind in selected position.

Therefore, in order to permit vertical adjustment of the blind, particularly lowering adjustment, it is necessary for clearance to be established between the dog and the cords. The extent of this clearance should be just as small as possible, however, otherwise re-engagement of the dog with the cords will be inconvenient. In fact, in some installations, as where the end of the blind with which the elevating cords and locking device are associated, is in or close to a corner, or where the blind is mounted within a box construction adapted to conceal the raised, or accumulated, blind, within a recess in the lintel, the adjacent portions of the building interfere with lateral movements of the cords, making it difficult to manipulate the cords so as to secure the engagement of the dog therewith which is necessary to lock the cords, unless only a minimum of clearance exists between the dog when fully retracted and the cords when hanging freely.

It is an object of the present invention therefore, to provide means in a cord anchoring device of the type indicated, for limiting the extent of retraction of the cord-engaging dog so as to establish the precise degree of clearance which will permit unrestricted movement of the elevating cords when desired, and yet which will permit engagement of the dog upon the cords to effect locking of the latter, with a minimum degree of lateral shifting of the cords.

A further object is to provide stop means limiting the retraction of the cord-engaging dog, which is subject to adjustment, whereby may be attained the precise setting which will insure the optimum operating conditions for any type of installation.

A further object in this connection is so to construct the cord anchoring device that the adjustable means for limiting retraction of the dog is accessible for adjustment after the blind has been installed, with the result that the installation crew can easily set the stop to its optimum position, aided by actual test to determine the limitations of lateral shifting of the cords imposed by adjacent portions of the building construction.

The invention possesses other objects and valuable features, some of which, with those enumerated, will be set forth in the following description of the preferred embodiment of our invention which is illustrated in the drawing accompanying and forming a part of the specification.

It is to be understood, however, that we do not limit ourselves to the showing made by the said drawing and description, as we may adopt variations of the preferred embodiment of our invention within the scope thereof as set forth in the claims.

Referring to the drawing.

Figure 1:
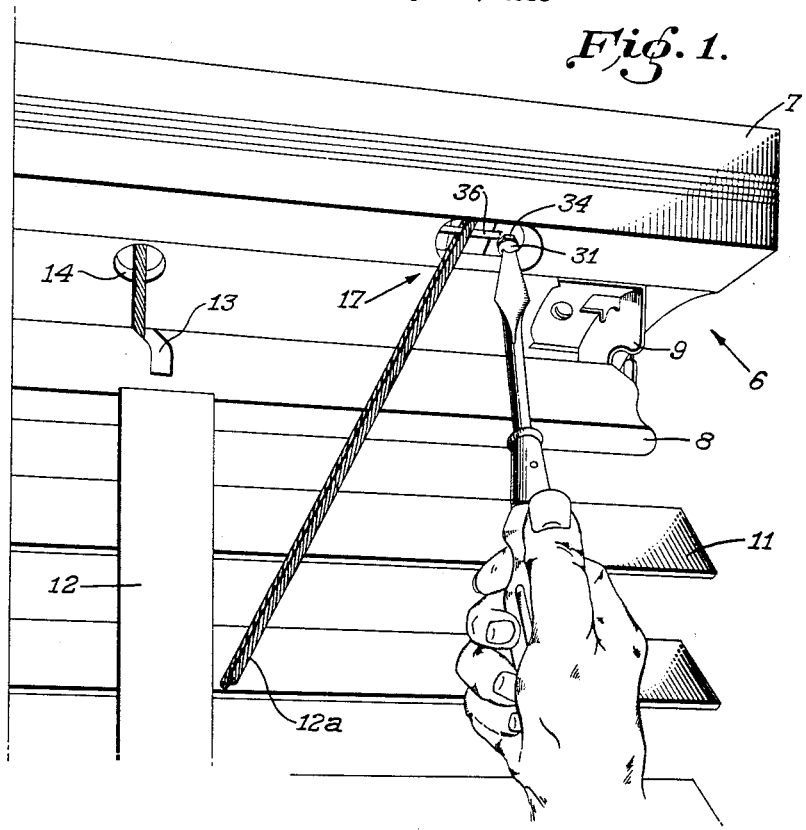
Figure 1 is a view in perspective of a portion of a Venetian blind and indicating the manner of association therewith of a cord anchoring device incorporating the principles of the present invention.

The figures illustrate a cord anchoring device incorporating the principles of the present invention as being cooperatively associated with a Venetian blind, indicated in its entirety at 6 and comprising a rail-head 7, from the under side of which a tilt rail 8 is suspended for operating adjustment, and brackets 9. The slats 11 constitute the major portion of the blind. These are suspended from the tilt rail 8 by ladder tapes 12 the members being so interassociated that the slats 11 and the tilt rail 8 are mounted in parallelism in respect to each other and all operated simultaneously through the expedient of suitable operating mechanism (not shown). The construction thus far described is preferably of conventional design as is also the elevating means which takes the form of preferably a pair of cords 12 each of which are attached at one end of the lowermost slat 11 (not shown), or "bottom rail" as it is called in the trade. From either respective points of attachment to the bottom rail, the cords 12 extend upwards through aligned slots 13 in the slats 11 and through suitable registering holes 14 in the head rail 7 where they pass around suitable sheaves (not shown), so as to permit both cords 12 to extend horizontally and longitudinally to the head rail 7 preferably through a groove 16 formed in the upper face thereof. Adjacent one end of the head rail 7 both cords 12 enter the cord anchoring device of the present invention which is indicated in its entirety at 17, pass around the sheave 18 which forms a portion thereof, thence hanging downwards through an opening 19 in the bottom of the housing 21 where they are accessible so as to facilitate elevational adjustment of the blind by pulling upon or releasing these free ends of the cords, that is to say, if the operator pulls the free ends the lowermost slat will be released gathering with it the slats thereabove and when the free ends of the cords are released the lower edge of the blind will be lowered in the well known manner.

The cord anchoring device 17 serves to lock the cords 12 when the blind has been adjusted to its desired position or elevation. It comprises the housing 21 preferably in the form of opposed sidewalls 22 from one of which a tape flange 23 extends laterally to provide means for attaching the cord stop 17 to the head rail 7, one or more conventional screws being employed for this purpose. The sheave 18 is revolvatably mounted between the sidewalls 22 upon a suitable pin 26 riveted or otherwise attached to preferably both sidewalls 22. The pin 26 is preferably disposed adjacent one end of housing 21; and preferably adjacent the other end of the housing 21 and slightly nearer the top of the housing 21, a second pin 27 is disposed in parallelism with the pin 26, this pin 27 also being preferably secured to both sidewalls 22. A locking dog 28 is pivotally mounted adjacent one end upon the pin 27 and its other end is toothed as at 29.

The parts are so proportioned and arranged that when the dog is withdrawn, its teeth 29 stand clear of the cords 12 which pass between the proximo or toothed end of the dog and the sheave 18. However, by moving upwards slightly the dog 28 will swing on its pivotal mounting 27, making the toothed end swing toward an inter-engagement with the cords 12 compressing them so firmly between the dog 28 and the sheave 18 that further motion of the cords 12 in that direction which accompanies lowering of the blind is prevented. The teeth 29 are provided to facilitate establishing frictional engagement of the dog 28 with the cords 12 inasmuch as the upward motion of the dog which is necessary to cause it to move in the locking engagement with the cords is attained through this frictional engagement, i. e., it is the cords themselves which impart the locking motion to the dog.

To release the cord locking device and thus enable the operator to effect a change in the adjustment of the blind, it is necessary only to pull downwards upon the free ends of the cords 12. The extent of such motion necessary to effect release is very slight—only enough movement of the cords in this direction to cause the dog to swing downwards out of engagement with the cords being required. However, inasmuch as it is only by re-engagement of the cords 12 upon the teeth 29 as they move downwards again that the dog 28 can be caused to move to locking position. However, it is desirable that means be provided to prevent the dog 28 from moving any further from the cords 12 than necessary when the dog is being retracted. For this purpose stop means are provided preferably in the form of the screw 31 threaded through preferably the bottom 32 of the housing 21 and extending therefrom toward the dog 28 in position to be engaged thereby as the dog falls away from the cords. Preferably a reinforced portion such as a boss 33 is provided on the bottom of 32 so as to extend the length of the tapped hole through which the screw 31 is threaded. A lock nut 34 is provided around the screw 31 in position to bear against the outer surface of the housing so as to releasably lock the adjusting screw 31 in selected adjustment.

Figure 2:
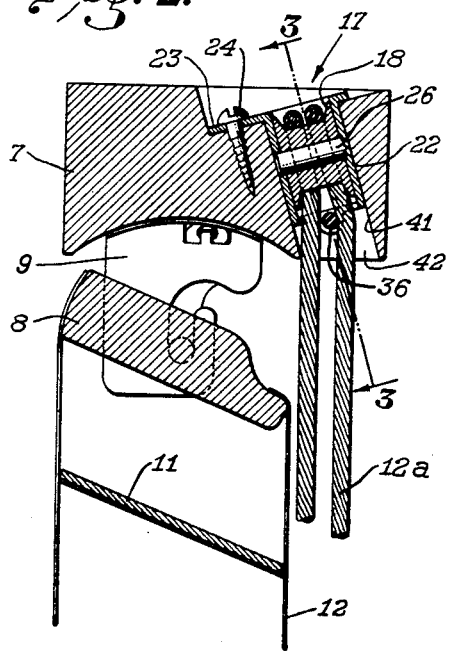
Figure 2 is a transverse, vertical sectional view taken through the upper part of the Venetian blind of Figure 1 and the cord anchoring device thereof.

The cord anchoring device 17 preferably is mounted in the head rail 7 so that the free ends of the cords 12 can hang straight downwards therefrom clear of the slats 11. Toward this end the cord anchoring device is preferably disposed at an angle with the vertical as clearly illustrated in Figure 2. Moreover a separator 36 is preferably provided extending across the opening 19 in the bottom 32 of the housing 21 through which the free ends of the cords 12 hang so as to insure their passing over the sheave without becoming toothed.

Figure 3:
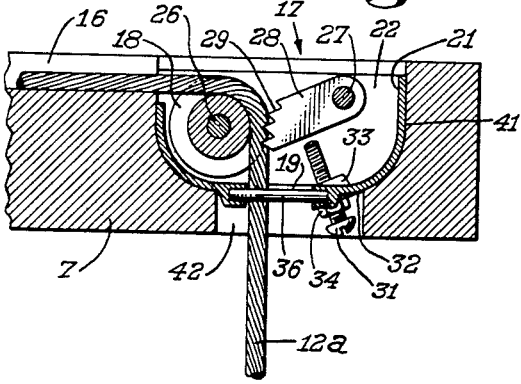
Figure 3 is a longitudinal sectional view, the plane of section being indicated by the line 3—3 of Figure 2 and the direction of view by the arrows.

The cord anchoring device 21 is disposed in a substantially complementary recess 41 in the head rail 7 and the free ends of the cords 12 hang through a hole 33. This hole 33 is large enough to accommodate the head of the adjusting screw 31 making it accessible from the underside of the head rail so that it can easily be adjusted after the blind has been installed in the manner clearly illustrated in Figure 1. This is a desirable feature because the distance that the dog 28 should be permitted to drop away from the cords 12 will not always be the same but will depend upon the circumstances of installation of each individual blind. When a blind is mounted so in the center of a flat wall no difficulty will be encountered in swinging the cords 12 far enough to the right (as viewed on Figures 1 and 3) to cause them to engage the dog 28 when fully retracted, so that upon their slight upward movement they will carry the dog with them and insure anchoring of the blind, therefore there will be no objection to permitting the dog 28 to fall relatively far away from the cords. However when the blind is installed in or near a corner where the intersecting wall will interfere with swinging the cords to the right, it is necessary that the dog 28 be prevented from swinging as far from the cords as in the previously described arrangement, otherwise it would be difficult or impossible for the operator to effect the re-engagement of the dog with the cords which is necessary to anchor the blind in the then selected position. It is apparent therefore, that the precise position of the window with respect to corners or other obstructing constructions is a determining factor as far as the optimum adjustment of the stop screw 31 is concerned, and it is for this reason that that feature of our invention which makes it possible for the installation crew to adjust the screw 31 or lock it in adjusted position after the blind has been installed, is of importance for the reason that it permits a crew to determine by actual test just how far the free ends of the cords can be swung toward the dog without interference from any portion of the building construction.

We claim:

1. An automatic stop for the elevating cord of a Venetian blind, comprising a housing, a sheave journalled within said housing, a locking dog toothed on one end and pivoted adjacent its other end within said housing, said cord extending between said sheave and said toothed end of said dog in position to be pressed against the former by the latter when said toothed end moves in the direction of movement of said cord during lowering of said blind, said cord hanging downwards from said sheave and dog, and said dog falling away from said cord by gravity when released from said cord, and an adjustable screw threaded through said housing and extending upwards therefrom to engage said dog to limit the clearance between said cord and dog when released.

2. An automatic stop for the elevating cord of a Venetian blind, comprising a housing, a sheave journalled within said housing, a locking dog toothed on one end and pivoted adjacent its other end within said housing, said cord extending between said sheave and said toothed end of said dog in position to be pressed against the former end of the latter when said toothed end moves in the direction of movement of said cord during lowering of said blind, said cord hanging downwards from said sheave and dog, and said dog falling away from said cord by gravity when released from said cord, an adjustable screw threaded through said housing and extending therefrom to engage said dog to limit the clearance between said cord and dog when released, and releasable means for locking said screw in selected position.

EDWARD O. Z. TOLLEY.
IRVIN JAMES HOFFMAN.